Patented Dec. 31, 1935

2,025,945

UNITED STATES PATENT OFFICE 2,025,945

PAVING MIXTURE AND METHOD OF PRODUCING SAME

Charles N. Forrest, Cranford, N. J., assignor to The Barber Asphalt Company, Philadelphia, Pa., a corporation of West Virginia No Drawing. Application July 11, 1932, Serial No. 622,018

13 Claims. (Cl. 106—31)

This invention relates to a method for producing bituminous paving mixtures and product thereof.

Heretofore in the production of bituminous paving mixtures suitable for, for example, road surfacing, it has been sought to enrich natural bituminous rock or to bituminize nonbituminous rock by admixing the rock in a suitably fine form with bitumen heated to render it fluid, or by first coating the rock with a bituminous emulsion and then adding bitumen heated to render it fluid (U. S. Patent No. 1,842,139). Such procedures have, however, not proved efficient or satisfactory in view of excessive cost, the impossibility of avoiding the use of excessive bitumen and of the difficulties in transporting and laying the mixtures arising from the necessity for heating them to enable them to be manipulated.

Generally speaking the method in accordance with this invention involves the production of bituminous paving mixture with the use of materials in an unheated state. The bituminous mixtures produced in accordance with the method embodying this invention will be found suitable for various purposes for which bituminous mixtures of the character are adaptable and especially for use in road building, road surfacing, etc. The bituminous mixtures will be adaptable for cold laying, though they may be heated prior to laying if desired, and will be readily compressed or consolidated by rolling, tamping or the like procedure.

In the practical adaptation of this invention from the broad standpoint a desired aggregate will be first admixed with a bituminous emulsion, preferably made with a soft bitumen, until the particles of the aggregate are coated with the emulsion; then there is mixed with the coated aggregate a quantity of powdered bitumen, preferably a hard bitumen, sufficient to make up the desired total amount of binder in the mixture and to adjust the consistency of the binder. In the procedure the amount of emulsion and the amount of powdered bitumen respectively may be widely varied, depending upon various factors, as the type of aggregate used and the characteristics desired for the finished mixture as, for example, those depending upon the use for which the mixture is intended.

In proceeding in accordance with this invention the powdered bitumen may be added to the emulsion coated aggregate before or after the emulsion becomes broken, since the addition of the powdered bitumen will assist in breaking the emulsion which necessarily must occur for proper coalescence of the powdered bitumen with the bitumen of the emulsion. Thus, where, for example, from the nature of the aggregate the emulsion breaks readily on admixture therewith the powdered bitumen may be added to the coated aggregate without any pretreatment to facilitate breaking of the emulsion. On the other hand, where from the nature of the aggregate the emulsion will only break slowly on admixture therewith, it will be desirable, more particularly for a saving in time, to treat the aggregate, as by admixing therewith, for example, an electrolyte, to facilitate breaking of the emulsion before the addition of the powdered bitumen.

The admixing of the emulsion with the aggregate and likewise the admixture of the powdered bitumen with the coated aggregate may be effected in any suitable mixing apparatus adaptable for the admixing of the several ingredients.

In carrying out the method in accordance with this invention any type of aggregate compatible with the ultimate use for which any particular composition is intended may be used, though preferably the aggregate will comprise a natural bituminous rock. Thus, for example, the aggregate may comprise natural bituminous sandstone, limestone, sand, etc. or mixtures thereof, or it may comprise non-bituminous sand, as bank or river sand, or any type of non-bituminous rock, or mixtures thereof. And it will be understood that the aggregate may comprise mixtures of natural bituminous and non-bituminous rock. The aggregate available for use will, if necessary, be crushed to relative fineness or to desired size.

The bituminous emulsion for admixture with the aggregate may comprise any suitable soft bitumen, or petroleum and which can be emulsified and thus rendered miscible in water in all proportions. The bitumen will desirably not have a Furol viscosity in excess of about 2000 seconds when tested at a temperature of 122° F. according to the standard method of Test for Viscosity of Petroleum Products, American Society for Testing Materials, Designation D 88-30. The bitumen may, for example, be a pressure still tar, a steam reduced residuum of petroleum, having a Furol viscosity at 122° F. of from somewhat below 600 seconds to 1000 seconds, etc., etc.

The emulsion may be made in any manner and with various emulsifiers well known to the art. For example, the emulsion may be made by adding, with agitation, molten bitumen to water containing a soap and the emulsion may contain widely varying amounts of water, say from 25% to 50% more or less.

The powdered bitumen, for admixture with the coated aggregate, may be any natural or artificial asphalt, of a character such that it can be reduced to a powder, as by grinding. For example, the powdered bitumen may comprise suitably ground Trinidad asphalt, Gilsonite or other pyrobitumen, hard bitumen produced from petroleum, etc., etc. or the like, or mixtures thereof.

In proceeding in accordance with this invention the aggregate of suitable fineness, say of the fineness of sand and having been ground, if necessary, is admixed with a quantity of an emulsion of soft bitumen, such as has been described. The amount of emulsion used will depend upon whether or not the aggregate is of a bitumen containing character, but in any event, while sufficient emulsion will be used to effectively coat the aggregate the amount used will be less than sufficient to supply the desired bitumen content of the finished mixture. Desirably the emulsion will be provided in amount such that the surfaces of the particles of the aggregate will be coated according to the inherent capacity of the aggregate for adsorption or absorption of the particular bitumen used. The admixing of the aggregate and emulsion may be effected in a pug mill, or other suitable mixer.

When the aggregate is substantially uniformly coated with the emulsion a quantity of powdered hard bitumen will be added to the mix and the mixing continued until the emulsion is completely broken. Where the aggregate is one naturally containing bitumen the powdered hard bitumen may be added to the mix as soon as the aggregate is coated, since in the mixing of the emulsion with such aggregate the emulsion will break relatively rapidly. On the other hand, where a non-bituminous aggregate is used, it will be desirable, after sufficient mixing to coat the aggregate, to add to the aggregate, prior to the addition of the powdered bitumen a substance to facilitate the breaking of the emulsion, as electrolyte, as a salt, lime, Portland cement, etc. If desired, when using a non-bituminous aggregate, it may be mixed with a part of the total amount of emulsion, the emulsion broken by the addition of an electrolyte and the balance of the emulsion added prior to the addition of the powdered bitumen.

Where the aggregate is composed of various sized particles, including particles of larger size than sand, it will be desirable to effect coating of the larger particles with emulsion separately in order to insure effective coating.

The amount of powdered bitumen to be used and the proportion thereof relative to the amount of soft bitumen, may vary within wide limits and will be dictated by the use for which the mixture is intended, but will be sufficient to provide with the soft bitumen a proper amount of binder for the aggregate and of a proper consistency. It will be noted, however, that the use of any material excess of either soft or hard bitumen, or total bitumen will be readily avoided, so that the mix will have the requisite characteristics, more particularly with respect to the wearing quality and consistency of the binder.

As illustrative of the practical adaptation of this invention for the production of a mix suitable for laying over a base or foundation such as concrete, brick, stone blocks, or the like, for the formation of a road surface, for example, a suitable mix, may be made on the following formula, using a natural bituminous sandstone containing about 3% of bitumen:

| | Parts by weight |
|---|---|
| Crushed bituminous sandstone | 92 |
| Emulsified soft bitumen having a Furol viscosity at 122° F. of 600-1000 seconds | 3 |
| Powdered Trinidad asphalt | 5 |
| | 100 |

In producing a mix on the above formula the emulsion is added to the crushed sandstone in a suitable mixer, as for example, a pug mill, and the two admixed until the particles of sandstone are well coated with the emulsion. Then the powdered Trinidad asphalt is added and the mixing continued until the powdered bitumen is distributed in the mass of coated aggregate, the emulsion having broken in the mixing, and the particles of aggregate are substantially uniformly coated with the combined bitumen. Desirably, the mixing is discontinued before any substantial fluxing of the powdered bitumen has taken place.

The mix produced, as detailed above, will be readily handled, transported, laid and consolidated in the cold, and after consolidation, as by rolling or tamping, will provide a durable road surface.

Where the bitumen containing aggregate is not available, a satisfactory mix may be made in accordance with this invention by the procedure detailed above, using a non-bituminous aggregate as, for example, any available crushed rock, or sand, and sufficient soft bitumen emulsion to coat the particles of the aggregate with bitumen according to their inherent capacity for adsorption or absorption of the specific bitumen used.

As illustrative of the preparation of a mix with use of a non-bituminous aggregate, for example, a satisfactory mix for use as road surfacing may be made up on the following formula:

| | Parts by weight |
|---|---|
| Crushed non-bituminous rock | 85 |
| Emulsified soft bitumen | 7 |
| Powdered Trinidad | 8 |

In preparing the mix on the above formula, the crushed rock and emulsion will be mixed in, for example, a pug mill, and either before or after the particles of aggregate are coated with the emulsion, an electrolyte; lime, Portland cement, or the like, in amount say within about the range 2%-10% will be added with continuation of the mixing to break the emulsion and insure coating of the aggregate with soft bitumen, after which the powdered Trinidad will be added and the mixing continued until the Trinidad is dispersed in the mass.

As a further example, a satisfactory mix may be made as described above on the following formula:

| | Per cent |
|---|---|
| Crushed, non-bituminous rock | 88 |
| Emulsified soft bitumen | 8 |
| Hard petroleum asphalt or Gilsonite | 4 |
| | 100 |

It will be understood that the addition of a substance to facilitate breaking of the emulsion is not essential but will be desirable for a saving in time.

It will now be observed that in accordance with this invention a bituminous paving mixture is produced by the application to particles of aggregate of a coating of soft bitumen applied in the form of an aqueous emulsion and the incorporation with such coating of a hard powdered bitumen in the cold, the incorporation of the hard powdered bitumen being thus effected without substantial fluxing thereof. On consolidation of the mixture, as by tamping or rolling on a roadway and exposure to solar heat, the hard powdered bitumen will become fluxed with the soft bitumen coated on the aggregate with formation of a homogeneous binder having desired wearing qualities and consistency.

The procedure in accordance with this invention results in the production of a highly efficient bituminous mixture and one in which the total bitumen content and the relative proportions of soft and hard bitumen may be nicely regulated by providing a binder for the aggregate having desired characteristics, as durability, wearing qualities, consistency, etc., with reference to the use for which it is intended.

The product in accordance with this invention will comprise an aggregate, of any suitable type and size. The particles of the aggregate will be coated with a soft bitumen and a hard bitumen in powdered form will be dispersed in the mass of the aggregate. The product will be characterized by the fact that the hard bitumen dispersed in powdered form will not be fluxed to any substantial extent with or by the soft bitumen until after the lapse of considerable time. As a consequence, the mixture may be transported and stored and subsequently laid and consolidated in the cold or without the necessity for any heating. The hard bitumen will have fluxed with the soft bitumen, after laying and consolidation, under the influence of solar heat.

It is to be understood that coal tar or coal tar pitch or mixtures of coal tar or coal tar pitch with asphalt or other bitumens, all of proper consistency, as is well known in the art, may be used as either the soft bitumen or the powdered hard bitumen or both.

What I claim and desire to protect by Letters Patent is:

1. The method of producing a granular bituminous paving mixture which includes admixing particles of a natural bituminous rock forming an aggregate with an aqueous emulsion of a soft bitumen until the particles of the aggregate are coated with the soft bitumen and admixing a powdered hard bitumen with the coated aggregate to form a binder for the aggregate.

2. The method of producing a granular, bituminous paving mixture which includes admixing particles of a natural bituminous rock forming an aggregate with an aqueous emulsion of a soft bitumen having a Furol viscosity at 122° F. not in excess of 2000 seconds until the particles of the aggregate are coated with the soft bitumen and admixing a powdered hard bitumen with the coated aggregate to form a binder for the aggregate.

3. The method of producing a granular, bituminous paving mixture which includes admixing particles of a natural bituminous rock forming an aggregate with an aqueous emulsion of a soft bitumen having a Furol viscosity at 122° F. not in excess of 2000 seconds until the particles of the aggregate are coated with the soft bitumen and admixing Trinidad asphalt in a solid state with the coated aggregate to form a binder for the aggregate.

4. The method of producing a granular, bituminous paving mixture which includes admixing particles of a natural bituminous rock forming an aggregate with an aqueous emulsion of a soft bitumen having a Furol viscosity at 122° F. not in excess of 2000 seconds until the particles of the aggregate are coated with the soft bitumen and admixing Gilsonite in a solid state with the coated aggregate to form a binder for the aggregate.

5. The method of producing a granular, bituminous paving mixture which includes enriching natural bituminous rock by the addition thereto in the cold of an emulsified soft bitumen and a hard bitumen in a solid state successively.

6. The method of producing a granular, bituminous paving mixture which includes admixing an aqueous emulsion of a soft bitumen with an aggregate, breaking the emulsion to effect coating of the aggregate with soft bitumen and admixing a powdered hard bitumen in the cold with the coated aggregate.

7. The method of producing a granular, bituminous paving mixture which includes admixing an aqueous emulsion of a soft bitumen with an aggregate, adding to the mix a substance which will cause the emulsion to break to effect coating of the aggregate with soft bitumen and admixing a powdered hard bitumen in the cold with the coated aggregate.

8. The method of producing a granular, bituminous paving mixture which includes admixing an aggregate with an aqueous emulsion of a soft bitumen, breaking the emulsion to effect coating of the aggregate with soft bitumen, admixing an aqueous emulsion of a soft bitumen with the coated aggregate and finally admixing a powdered hard bitumen in the cold with the aggregate.

9. A granular, bituminous paving mixture including in admixture an aggregate coated with a soft bitumen by breaking of a water-external phase soft bitumen emulsion and a hard bitumen in powdered form dispersed in the mass of the aggregate, without substantial coalescence with the soft bitumen.

10. The method of producing a bituminous paving mixture which includes admixing an aggregate with an aqueous emulsion of a soft bitumen until the particles of the aggregate are coated with the soft bitumen and admixing a powdered hard bitumen in a solid state with the coated aggregate and discontinuing the admixing of the powdered bitumen when the powdered bitumen has been dispersed in the mass of coated aggregate and before any substantial coalescence of the hard bitumen with the soft bitumen occurs.

11. A granular bituminous paving mixture including in admixture an aggregate coated with a soft bitumen by breaking of a water-external-phase soft bitumen emulsion and Trinidad asphalt in powdered form dispersed in the mass of the aggregate, without substantial coalescence with the soft bitumen.

12. A granular bituminous paving mixture including in admixture an aggregate coated with a soft bitumen by breaking of a water-external-phase soft bitumen emulsion and Gilsonite in powdered form dispersed in the mass of the aggregate, without substantial coalescence with the soft bitumen.

13. A granular bituminous paving mixture including in admixture sand coated with soft bitumen by breaking of a water-external-phase soft bitumen emulsion and a hard bitumen in powdered form dispersed in the mass of sand without substantial coalescence with the soft bitumen.

CHARLES N. FORREST.